United States Patent
Vinciarelli

(10) Patent No.: US 7,202,646 B2
(45) Date of Patent: Apr. 10, 2007

(54) CONTROL INTERFACE WITH DROOP COMPENSATION

(75) Inventor: Patrizio Vinciarelli, Boston, MA (US)

(73) Assignee: VLT, Inc., Sunnyvale, CA (US)

( * ) Notice: Subject to any disclaimer, the term of this patent is extended or adjusted under 35 U.S.C. 154(b) by 57 days.

(21) Appl. No.: 10/910,524

(22) Filed: Aug. 2, 2004

(65) Prior Publication Data

US 2006/0022650 A1  Feb. 2, 2006

(51) Int. Cl.
  G05F 1/563 (2006.01)
  G05F 1/59 (2006.01)
(52) U.S. Cl. .................. 323/266; 323/268; 323/285
(58) Field of Classification Search .............. 323/266, 323/225, 268–272, 283, 285, 351; 700/297, 700/298; 713/300, 340
See application file for complete search history.

(56) References Cited

U.S. PATENT DOCUMENTS

| | | | |
|---|---|---|---|
| 5,443,534 A | | 8/1995 | Vinciarelli |
| 6,222,742 B1 * | | 4/2001 | Schlecht ...................... 363/16 |
| 6,229,724 B1 * | | 5/2001 | Virtanen ...................... 363/89 |
| 6,357,011 B2 * | | 3/2002 | Gilbert ...................... 713/300 |
| 6,441,590 B1 * | | 8/2002 | Amantea et al. ............ 323/266 |
| 6,628,013 B2 * | | 9/2003 | Vogman ...................... 307/85 |
| 6,788,033 B2 | | 9/2004 | Vinciarelli |
| 6,806,773 B1 * | | 10/2004 | Simmons et al. ........... 330/292 |
| 6,930,893 B2 * | | 8/2005 | Vinciarelli .................... 363/17 |
| 2003/0142513 A1 | | 7/2003 | Vinciarelli |

OTHER PUBLICATIONS

Electronic Design Webcast, Mar. 25, 2004, pp. 1-113, See pp. 60-62.

* cited by examiner

Primary Examiner—Gary L Laxton
(74) Attorney, Agent, or Firm—Fish & Richardson P.C.

(57) ABSTRACT

A droop compensation system includes a controlled current source that provides a scaled model of the PRM output current or VTM input current on an interface connection. A controlled resistance modeling the VTM effective series input resistance is connected across the interface terminal. The voltage developed across the controlled resistance by the controlled current establishes a correction signal representative of the VTM droop that is used to adjust the PRM output thereby compensating for the droop. A VTM control interface provides a mechanism for enabling and disabling the VTM. The VTM control circuitry may be powered by the interface connection, allowing the VTM to operate and process power when the VTM input voltage is below its normal minimum operating voltage, increasing the VTM dynamic range and allowing "soft start" into a capacitive load.

62 Claims, 7 Drawing Sheets

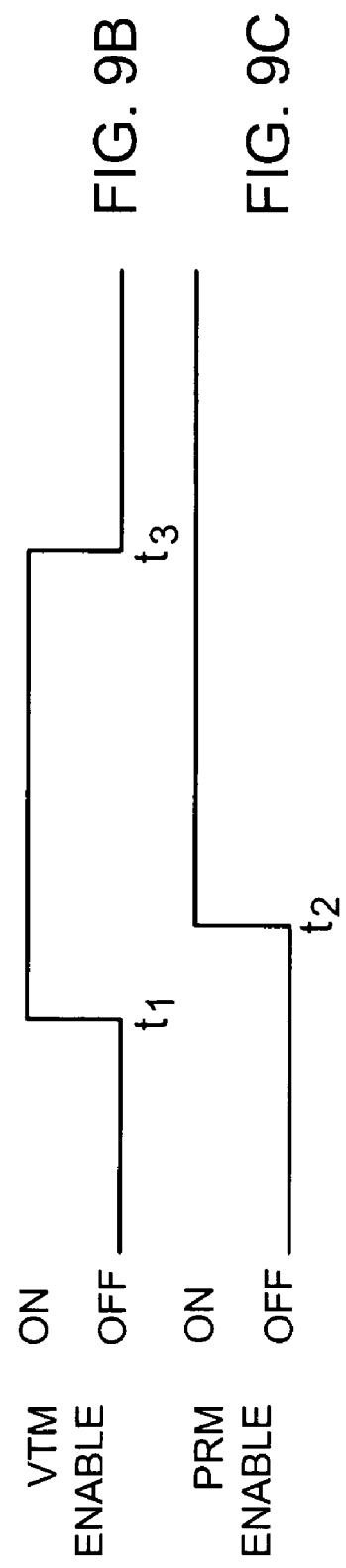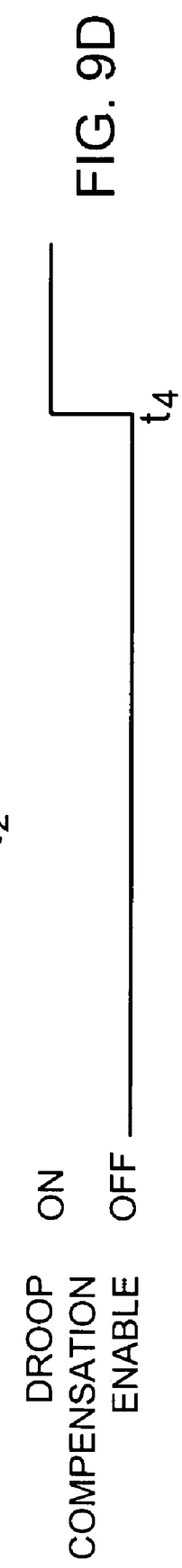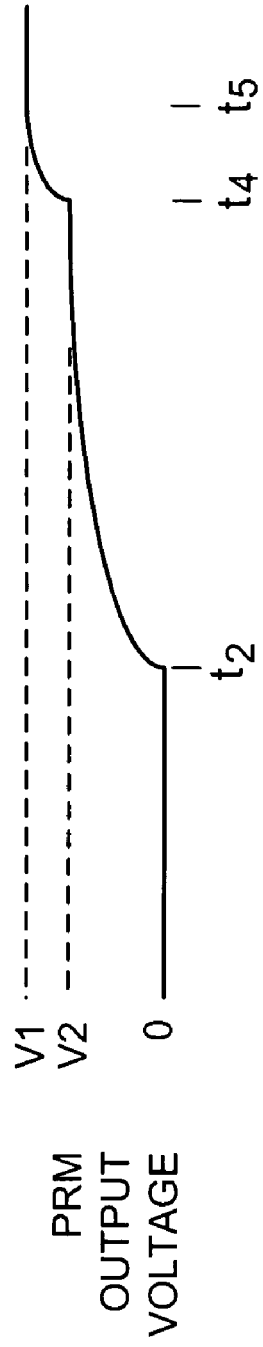
FIG. 9A
FIG. 9B
FIG. 9C
FIG. 9D
FIG. 9E

CONTROL INTERFACE WITH DROOP COMPENSATION

TECHNICAL FIELD

This invention relates to the field of electrical power conversion and more particularly to distributed electronic power conversion systems such as factorized power architectures.

BACKGROUND

A power distribution architecture, called a "Factorized Power Architecture" ("FPA"), is described in Vinciarelli, "Factorized Power Architecture," U.S. patent application Ser. No. 10/264,327, filed Oct. 1, 2002 (the "Factorized Application"), assigned to the same assignee as this application and incorporated here by reference. In general, the power density, efficiency, and flexibility of a point-of-load power converter, and the power-sharing performance of paralleled arrays of such converters, may be improved by factorizing away the power conversion functions associated with voltage regulation and by providing only essential functions at the point-of-load, such as voltage transformation and/or isolation.

One example of a FPA, system 20, is shown in FIG. 1. An upstream power regulator module ("PRM") 21, at a first location accepts power from an input source 22 and converts it into a controlled bus voltage at its output, $V_f$, which is distributed over a distance via a "factorized" distribution bus 23 to a remotely located Voltage Transformation Module ("VTM") 24. The VTM includes an isolation transformer (not shown) and transforms the voltage $V_f$ into a voltage $V_{out}$, for delivery to a load 25. The VTM 24 delivers a DC output voltage, $V_{out}$, which, for a certain load current, is essentially a fixed fraction of the voltage, $V_{in}$ (nominally $V_f$) delivered to its input.

The voltage transformation ratio or voltage gain of the VTM (which may be defined as the ratio, $K=V_{out}/V_{in}$, of its output voltage to its input voltage at a load current) is fixed by design, e.g. by the VTM converter topology, its timing architecture and the turns ratio of the transformer included within it. The sine amplitude converter ("SAC") disclosed in the Factorized Application is preferred for its high performance characteristics, including a low effective output resistance and elimination of inductive and capacitive impedances in the series output impedance. The effective output resistance or output impedance, as the case may be, of a VTM will cause some "droop" in output voltage as a function of load current without some form of compensation.

Modem electronic systems such as telecommunications systems and computer systems require power to be supplied at several different voltages and oftentimes require the controlled sequencing of the voltages while powering up and powering down the system. Referring for example to FIG. 2, a prior art distributed power architecture ("DPA") system 30 is shown with a power source 31 supplying power to a front end 32. The front end conditions the power and delivers a nominal DC bus voltage VBUS to a plurality of DC-DC converters 34A–34C that provide isolation, voltage transformation, and output regulation, deliver power at regulated voltages $V_{LA}$–$V_{LC}$ to respective loads 25A–25C. A controller 33 provides signals 36A–36C to enable or disable respective converters 34A–34C providing the necessary sequencing of output voltages. Many commercially available DC-DC converters include an enable/disable pin with which a controller e.g., controller 33 could be interfaced to properly control the timing and sequence of the power sources throughout the system. For example, Vicor, 25 Frontage Road, Andover, Mass. 01810 offers first and second generation DC-DC converters having Gate-In and Primary-Control ("PC") terminals, respectively, that may be used for enabling and disabling the power converters.

SUMMARY

In general, one aspect features an apparatus with an upstream regulator having a regulator input for receiving power from a source, a regulator output for delivering power at an output current and a controlled voltage, and an upstream signal interface ("USI"). A downstream voltage transformation module ("VTM") may have a VTM input for receiving power from the regulator output, a VTM output for supplying power to a load, and a downstream signal interface ("DSI") for connection to the USI. The VTM may have an essentially fixed voltage transformation ratio $K=V_{out}/V_{IN}$ and may provide isolation between the VTM input and VTM output. The upstream regulator may provide a first control signal to activate the VTM via the USI-DSI connection. The VTM may provide feedback to the upstream regulator via the USI-DSI connection.

In general, another aspect features an apparatus with an upstream regulator at a first location having a regulator input for receiving power from a source, a regulator output for delivering power at an output current and a controlled voltage, and an upstream signal interface ("USI"). A downstream voltage transformation module ("VTM") at a remote location may be separated by a distance from the first location and may include a VTM input for receiving power from the regulator output, a VTM output for supplying power to a load, and a downstream signal interface ("DSI") for connection to the USI. The VTM may have an essentially fixed voltage transformation ratio $K=V_{OUT}/V_{IN}$ and may provide isolation between the VTM input and VTM output. The VTM may provide a compensation signal representative of imperfections in the VTM to the upstream regulator via the USI-DSI connection. The upstream regulator may adjust the controlled voltage in response to the compensation signal.

In general, another aspect features an apparatus with an upstream regulator having a regulator input for receiving power from a source, a regulator output for delivering power at an output current and a controlled voltage, and an upstream signal interface ("USI"). A downstream voltage transformation module ("VTM") may have a VTM input for receiving power from the regulator output, a VTM output for supplying power to a load, and a downstream signal interface ("DSI") for connection to the USI. The VTM may have an essentially fixed voltage transformation ratio $K=V_{out}/V_{IN}$ and provide isolation between the VTM input and VTM output. The VTM may include control circuitry adapted to activate the VTM in response to a first control signal received via the DSI and may run off of power derived from the first control signal. The regulator may be adapted to send the first control signal via the USI terminal to activate the VTM.

In general, another aspect features a method that uses an upstream regulator having an upstream signal interface ("USI") to receive power from a source and deliver power at an output current and a controlled voltage to a regulator output. A downstream voltage transformation module ("VTM") may have a downstream signal interface ("DSI") for connection to the USI, an essentially fixed voltage transformation ratio $K=V_{OUT}/V_{IN}$ and isolation between a VTM input and a VTM output to receive power from the regulator output via the VTM input and to supply power to a load via the VTM output. A connection may be provided between the USI and the DSI. A first control signal may be sent via the USI-DSI connection to activate the VTM. The VTM may provide feedback to the upstream regulator via the USI-DSI connection.

In general, another aspect features a method that uses an upstream regulator to receive power from a source and deliver power at an output current and a controlled voltage to a regulator output at a first location. The regulator may have an upstream signal interface ("USI"). A downstream voltage transformation module ("VTM") may be used at a remote location separated by a distance from the first location to receive power from the regulator output via the VTM input and to supply power to a load via the VTM output. The VTM may have a downstream signal interface ("DSI") for connection to the USI, an essentially fixed voltage transformation ratio $K=V_{OUT}/V_{IN}$ and provide isolation between a VTM input and a VTM output. A connection may be provided between the USI and the DSI. The VTM may provide a compensation signal representative of imperfections in the VTM to the upstream regulator via the USI-DSI connection. The upstream regulator may adjust the controlled voltage in response to the compensation signal.

In general, another aspect features a method that uses an upstream regulator having an upstream signal interface ("USI") to receive power from a source and deliver power at an output current and a controlled voltage to a regulator output. A downstream voltage transformation module ("VTM") may be used to receive power from the regulator output via the VTM input and to supply power to a load via the VTM output. The VTM may have a downstream signal interface ("DSI") for connection to the USI, an essentially fixed voltage transformation ratio $K=V_{OUT}/V_{IN}$ and provide isolation between a VTM input and a VTM output. A connection between the USI and the DSI may be provided. A first control signal may be sent via the USI-DSI connection to activate the VTM and to also power the VTM.

Implementations of the above apparatuses and methods may include one or more of the following features. The VTM may be connected to receive power from the upstream regulator via the USI-DSI connection when a voltage of the regulator output is below a predefined level. The upstream regulator may provide power to the VTM via the USI-DSI connection. The upstream regulator may include a current source connected to the USI to provide a current proportional to an output current provided by the regulator output. The upstream regulator may source a current to the USI that is proportional to an output current provided by the regulator output. A controlled resistance that has a resistance value that is an approximation of an effective series resistance of the VTM may be connected to the DSI. The upstream regulator may include circuitry for sensing a USI voltage at the USI and adjusting the regulator output in response to changes in the USI voltage. A USI voltage at the USI may be sensed and the regulator output may be adjusted in response to changes in the USI voltage. The effective series resistance may be an input resistance. The effective series resistance may be temperature dependent and the resistance value may be a function of VTM temperature. The upstream regulator may regulate a voltage of the regulator output. The upstream regulator may regulate a voltage at the output of the VTM using the USI-DSI connection.

In general, another aspect features an apparatus including a voltage transformation module ("VTM") having a VTM input for receiving power at a controlled voltage from a power regulator, a VTM output, and circuitry for converting power received from the VTM input via a transformer, delivering power to a load at the VTM output, and providing isolation between the VTM input and VTM output. The VTM may be characterized by an essentially fixed voltage transformation ratio $K=V_{OUT}/V_{IN}$, where $V_{OUT}$ is the voltage at the VTM output and $V_{IN}$ is the voltage at the VTM input, and an effective VTM series resistance. The VTM may include control circuitry for operating the VTM; and an interface circuit adapted to generate a signal representative of imperfections in the VTM. The VTM may be packaged separately from the power regulator.

In general, another aspect features an apparatus including a voltage transformation module ("VTM") having a VTM input, a VTM output, and circuitry for converting power received from the VTM input via a transformer, delivering power to a load at the VTM output, and providing isolation between the VTM input and VTM output. The VTM may be characterized by an essentially fixed voltage transformation ratio $K=V_{OUT}/V_{IN}$, where $V_{OUT}$ is the voltage at the VTM output and $V_{IN}$ is the voltage at the VTM input, and an effective VTM series resistance. An interface circuit may be adapted to receive a first control signal and activate the VTM in response to receipt of the first control signal. Control circuitry may be adapted to operate the VTM and to run off of power derived from the first control signal.

Implementations of the above apparatuses may include one or more of the following features. The signal may represent the effective VTM series resistance. The signal may represent the VTM droop. The interface circuit may comprise a controlled resistance. The controlled resistance may be a temperature compensated model of the effective VTM series resistance. The controlled resistance may be a temperature compensated model of the effective VTM series input resistance. The interface circuit may include circuitry adapted to receive a first control signal and activate the VTM in response to receipt of the first control signal. The control circuit may be adapted to run off of power derived from the first control signal. The interface circuit may deactivate the VTM in response to receipt of the second control signal.

In general, another aspect features a method which provides a voltage transformation circuit having an input, an output, and a signal interface, to convert power received at a controlled voltage from an external power regulator via the input and to supply power to an external load via the output using an essentially fixed voltage transformation ratio $K=V_{OUT}/V_{IN}$ and providing isolation between the input and the output. The circuit may have an effective series resistance. An interface circuit adapted to generate a signal representative of imperfections in the voltage transformation circuit may be provided. The voltage transformation circuit and interface circuit may be enclosed in a first package separately from the power regulator.

In general, another aspect features a method which provides a voltage transformation circuit having an input, an output, and a signal interface, to convert power received at a controlled voltage from an external power regulator via the input and to supply power to an external load via the output using an essentially fixed voltage transformation ratio $K=V_{OUT}/V_{IN}$ and providing isolation between the input and the output. The circuit may have an effective series resistance. An interface circuit adapted to activate the voltage transformation circuit in response to receipt of a first control signal from the signal interface may be provided. The voltage transformation circuit may be powered by the first control signal. The voltage transformation circuit and interface circuit may be enclosed in a first package separately from the power regulator.

Implementations of the above methods may include one or more of the following features. The signal may represent the VTM effective series resistance. The signal may represent droop in an output voltage of the voltage transformation circuit. The interface circuit may include a controlled resistance. The controlled resistance may be a temperature compensated model of the effective series resistance. The controlled resistance may be a temperature compensated model of the effective series input resistance. The interface circuit may activate the voltage transformation circuit in response to receipt of a first control signal from the signal interface. The voltage transformation circuit may be powered by the first control signal.

In general, another aspect features an apparatus including a power regulator module ("PRM") having an input for receiving power from a source and an output for delivering power to a voltage transformation module ("VTM") at an output current and a controlled voltage. An interface circuit may have an upstream interface ("USI") terminal for connection to a downstream interface ("DSI") terminal at the VTM. The interface circuit may be adapted to receive a compensation signal via the USI terminal representative of imperfections in the VTM and adjust the controlled voltage in response to the compensation signal. The interface circuit may be adapted to send a first control signal via the USI terminal to activate the VTM.

In general, another aspect features an apparatus including a power regulator module ("PRM") having an input for receiving power from a source and an output for delivering power to a voltage transformation module ("VTM") at an output current and a controlled voltage. Regulation circuitry may maintain the controlled voltage. An interface circuit may have an upstream interface ("USI") terminal for connection to a downstream interface ("DSI") terminal at the VTM. A source circuit may have an output adapted to send a first signal to the VTM via the USI terminal. A sense circuit may have an input adapted to receive a compensation signal via the USI terminal representative of imperfections in the VTM and an output connected to the regulation circuitry to adjust the controlled voltage in response to the compensation signal.

In general, another aspect features an apparatus including a power regulator module ("PRM") having an input for receiving power from a source, an output for delivering power to a voltage transformation module ("VTM") at an output current and a controlled voltage, and an interface circuit having an upstream interface ("USI") terminal for connection to a downstream interface ("DSI") terminal at the VTM. The interface circuit may include a source for powering the VTM via the USI.

In general, another aspect features a method that uses a power regulator circuit having an input for receiving power from a source, to deliver power at a controlled voltage and at an output current to an output for a downstream VTM. The power regulator circuit may have an interface terminal. The interface terminal may be used to receive a compensation signal and adjust the controlled voltage in response to the compensation signal. The interface terminal may be used to send a first control signal to activate the VTM.

In general, another aspect features a method that uses a power regulator circuit having an input for receiving power from a source, to deliver power at a controlled voltage and at an output current to an output for a downstream VTM. The power regulator circuit may have an interface terminal. The interface terminal may be used to send a first signal to the VTM and to receive a compensation signal representative of imperfections in the VTM and adjust the controlled voltage in response to the compensation signal.

In general, another aspect features a method that uses a power regulator circuit having an input for receiving power from a source, to deliver power at a controlled voltage and at an output current to an output for a downstream VTM. The power regulator circuit may have an interface terminal. The interface terminal may be used to receive a compensation signal and adjust the controlled voltage in response to the compensation signal. A source for powering the VTM may be connected to the interface terminal.

Implementations of the above apparatuses and methods may include one or more of the following features. The interface circuit may be adapted to request a compensation signal from the VTM using a polling signal sent from the interface circuit via the USI terminal to the DSI terminal. The interface terminal may be used to send a polling signal to request a compensation signal from the VTM. The polling signal may be a controlled current. The compensation signal may be a voltage representative of VTM droop. The interface circuit may comprise a controlled current source having an output connected to the USI terminal for supplying the controlled current and a sense circuit for sensing the voltage at the USI terminal. The controlled current may be proportional to the output current. The PRM may include a reference circuit and the sense circuit may have an output coupled to the reference circuit to adjust the controlled voltage. The PRM may include a source for powering the VTM via the USI. A source for powering the VTM may be connected to the interface terminal. The interface circuit may send and receive digital signals via the USI terminal. Digital signals may be used to communicate via the interface terminal. The first signal may be representative of the output current.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 9A–9E show waveforms for control system during start up.

Like reference symbols in the various drawings indicate like elements.

DETAILED DESCRIPTION

Figure 8A:
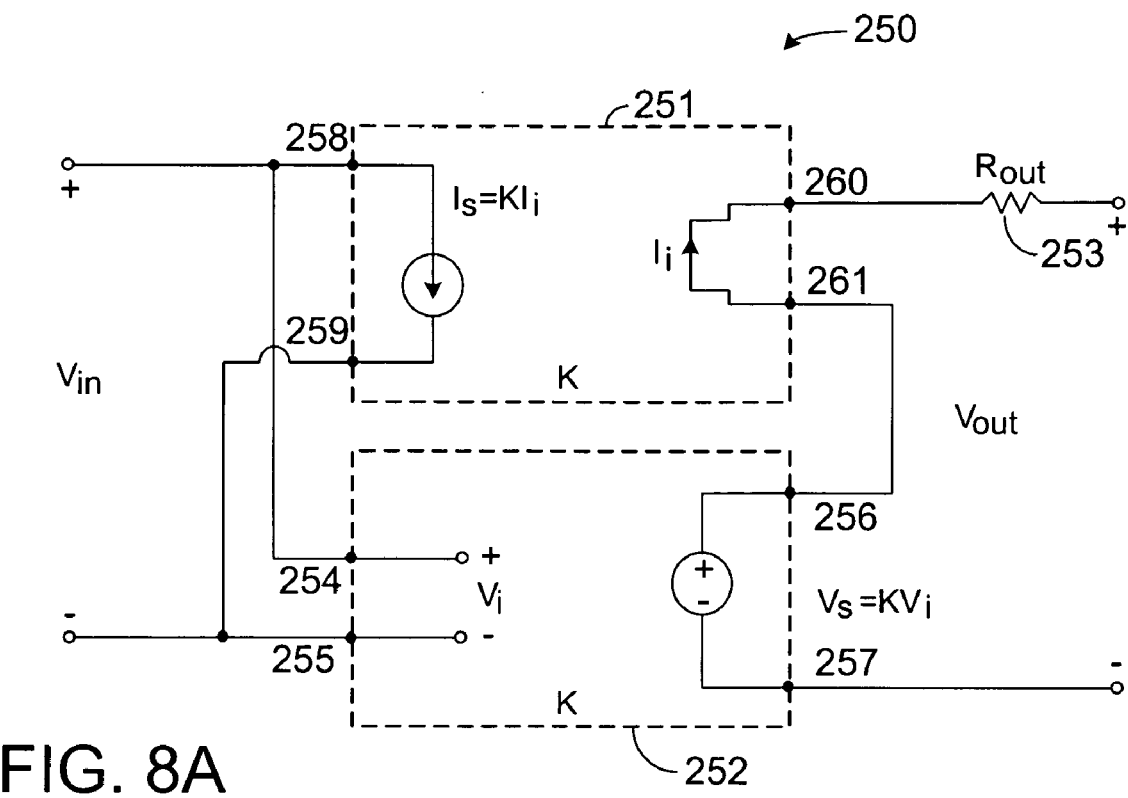
FIGS. 8A and 8B are simplified models of a bi-directional VTM.
Figure 8B:
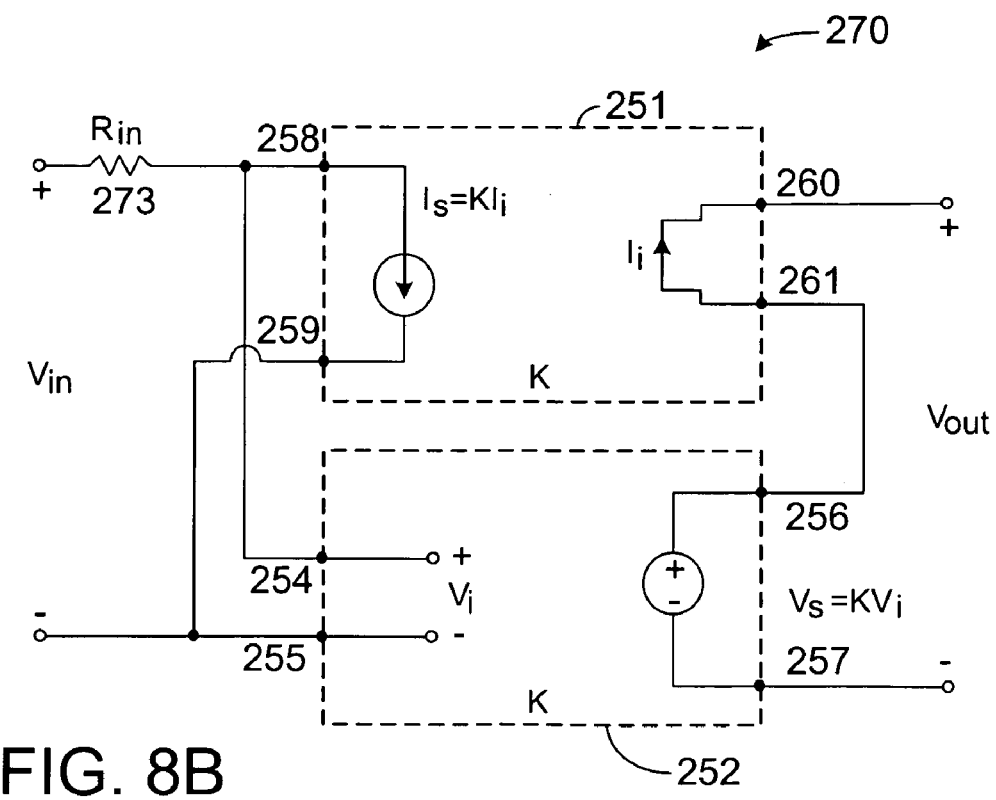

A simplified circuit model 250 of a bidirectional VTM, shown in FIG. 8A, may be constructed by combining 3 standard SPICE components: 1) a "Voltage Controlled Voltage Source" (VCVS) 252 with a transformation ratio K; 2) a "Current Controlled Current Source" (CCCS) 251 with a transformation ratio K; and 3) a resistor 253 of value $R_{out}$. The VCVS accepts an input voltage $V_i$ at its input terminals 254, 255 and produces an output voltage, $V_S = K*V_i$, at its output terminals 256, 257. The VCVS has infinite input impedance and zero output impedance. A current $I_i$ flowing between the input terminals 260, 261 of the CCCS causes a current $I_S = K*I_i$ to flow between CCCS output terminals 258, 259. There is zero impedance between the input terminals of the CCCS. In the model 250, the VCVS input voltage $V_i$ equals the VTM input voltage $V_{IN}$ and the CCCS input current $I_i$ equals the VTM output current $I_{OUT}$. The VCVS senses, at its input terminals 254, 255, the voltage, $V_{IN}$, at the input of the VTM and generates a voltage at its output terminals 256, 257 equal to $K*V_{IN}$. The CCCS senses, between its input terminals 260, 261, the output current of the VTM, $I_{OUT}$, and causes a current equal to $K*I_{OUT}$ to be drawn from VTM input source, thus conserving total power. The effective series resistance of the VTM representing the primary mechanism of power conversion losses reflected to the output side of the VTM is shown as resistor $R_{out}$, in series with the VTM output, and defines the open loop VTM output resistance. An alternative model 270 of the VTM is shown in FIG. 8B in which the effective series resistance of the VTM is reflected to the input side and is shown as input resistance 273 having a value $R_{IN}$. The input resistance is related to the output resistance by the square of the voltage transformation ratio.

$$R_{IN} = K^2 * R_{OUT}$$

Figure 1:
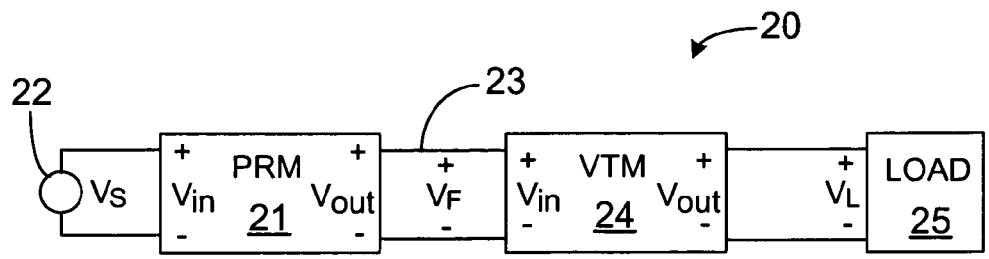
FIG. 1 shows a block diagram of an example of a FPA.
Figure 2:
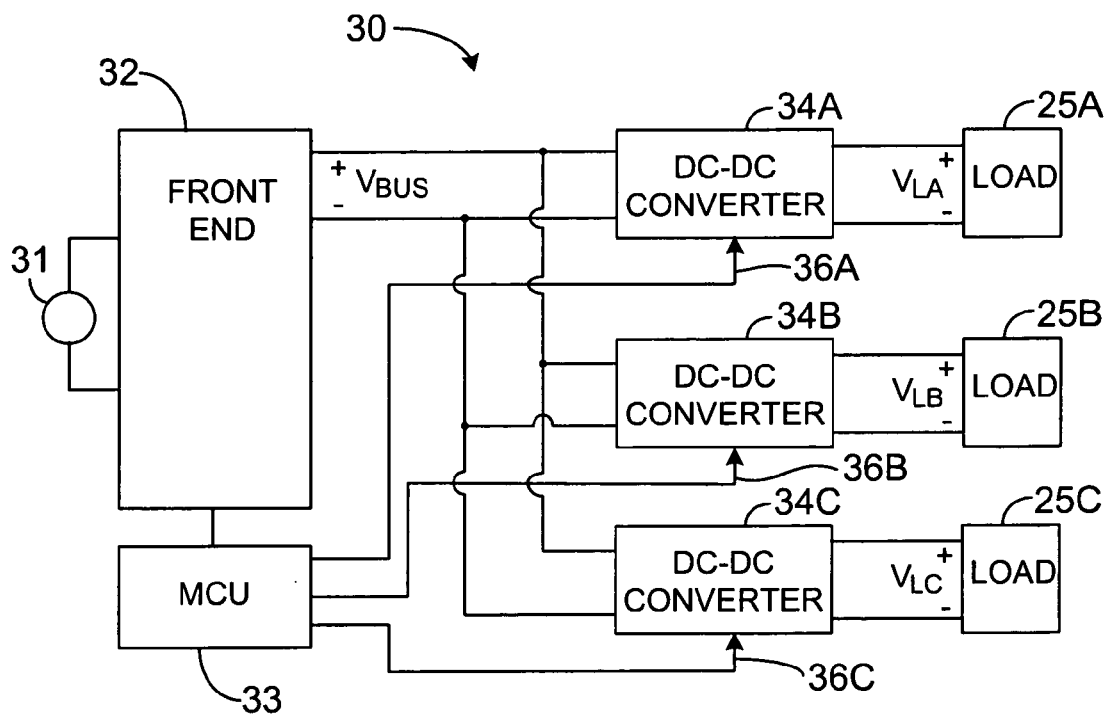
FIG. 2 shows a block diagram of a DPA with a controller for sequencing the output voltages.
Figure 3:
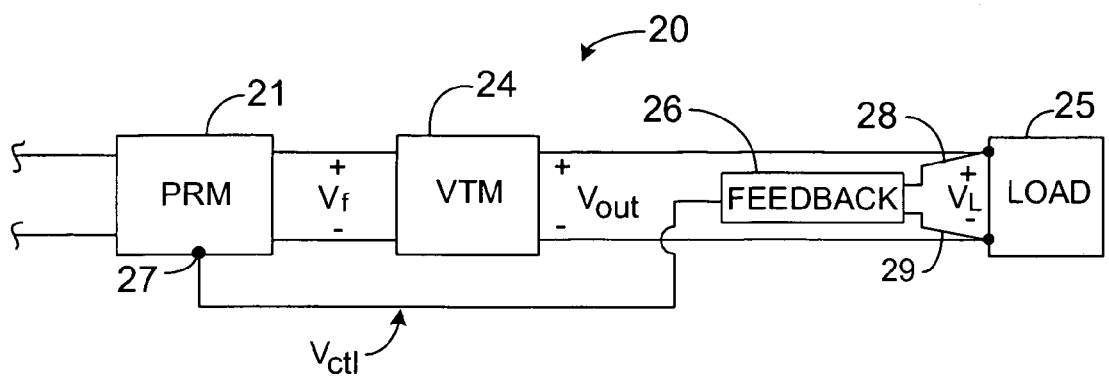
FIG. 3 shows a block diagram of a FPA with remote feedback from a point-of-load feedback controller to a PRM.
Figure 4:
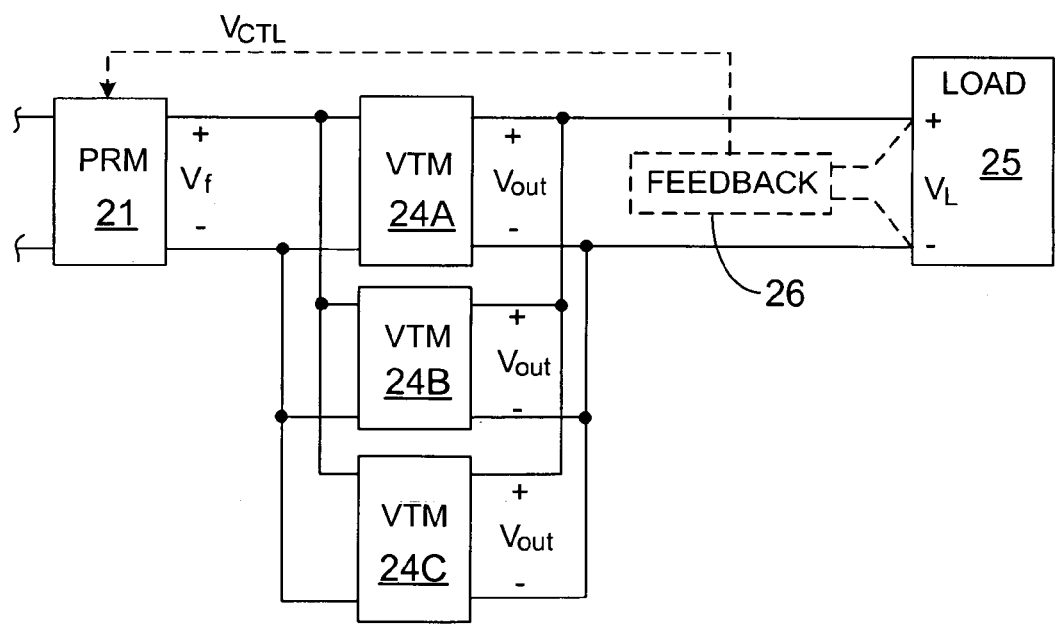
FIG. 4 shows a block diagram of a FPA with a power-sharing array of VTMs with optional remote feedback from a point-of-load feedback controller to a PRM.

Referring to FIG. 1, the series resistance of a VTM (FIGS. 8A and 8B) impairs the open-loop regulation in a FPA system by causing the output voltage to droop as the load current is increased due to the voltage drop across the series resistance whether reflected to the input side or the output side. In some applications the droop may be 5%, or more, as the load varies over its full range. One way to compensate for the open-loop droop in a FPA is shown in FIG. 3. A feedback circuit 26 senses the load voltage at the point of load and sends a control signal 27 to the PRM to adjust the factorized bus voltage thereby compensating for droop. FIG. 4 shows an array of VTMs 24A–24C supplying power to a load 25. An optional feedback controller 26 may provide feedback to the PRM to compensate for droop. The feedback systems shown in FIGS. 3 and 4 cross the isolation barrier (provided by the VTM or VTM array) between the PRM and the load, which increases cost and complexity.

Droop Compensation

Figure 5A:
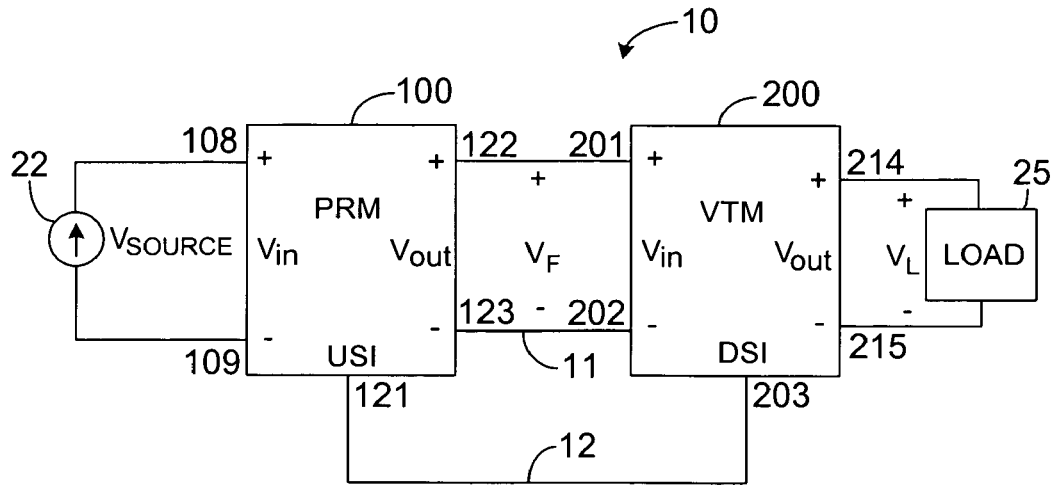
FIGS. 5A and 5B show block diagrams of a FPA with a control and feedback interface.

An improved compensation system will be described in connection with FIGS. 5–7. In FIG. 5A, a FPA system 10 includes a PRM 100 which receives power from a source 22 on input terminals 108, 109 and delivers an output voltage at terminals 122, 123 to a factorized bus 11. PRM 100 may be located a distance from the VTM 200. The PRM and VTM may be mass produced components selected from a family of PRM and VTM products designed for use in FPA systems. VTM 200 receives power from the factorized bus via input terminals 201, 202, and transforms the voltage $V_F$ into a voltage $V_{OUT}$ for delivery via output terminals 214, 215 to a load 25. As described above, the effective series resistance of the VTM causes the output voltage to droop as load current increases in an open-loop system. A single bi-directional interface connection 12 between the PRM 100 and the VTM 200 may be used to enable or disable the VTM under control from the PRM and also allow the VTM to send information to the PRM allowing the PRM to adjust the factorized voltage to improve load regulation.

The droop compensation system may include a current source at the PRM to output a controlled current to the VTM via the interface connection 12. The controlled current $I_M$ may be a scaled replica of the PRM output current $I_{PRM}$ (e.g. $I_M = I_{PRM} * 10^{-3}$). The VTM may provide a controlled resistance at the interface connection 12. The controlled resistance $R_{Ctrl}$ may be a scaled model of the effective VTM series input resistance $R_{IN}$ (e.g. $R_{Ctrl} = R_{IN} * 10^3$). The voltage developed across the controlled resistance $R_{Ctrl}$ due to the controlled current $I_M$ will be a close approximation of the voltage droop in the VTM effective series input resistance. A compensation circuit at the PRM may be used to sense the voltage at the interface connection 12 and adjust the output voltage of the PRM to compensate for the droop. In this way the PRM may poll the VTM for information about the effective series resistance of the VTM.

Figure 5B:
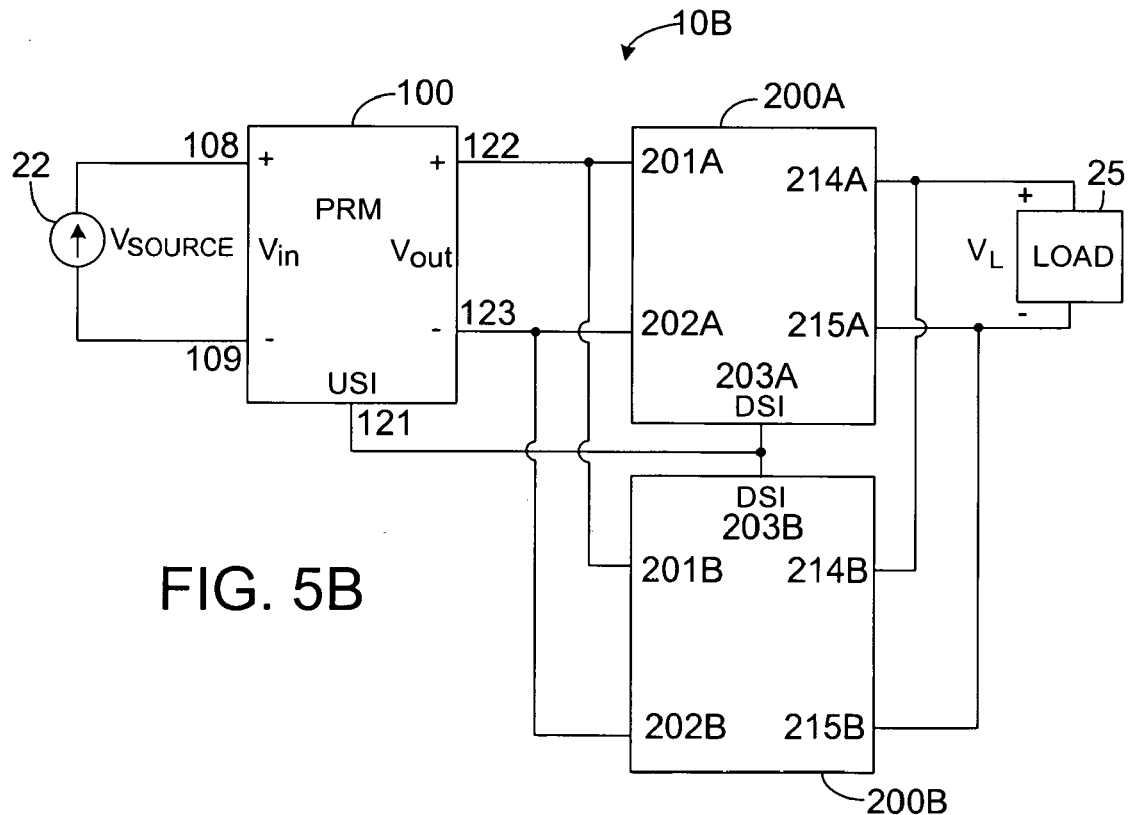
Figure 6:
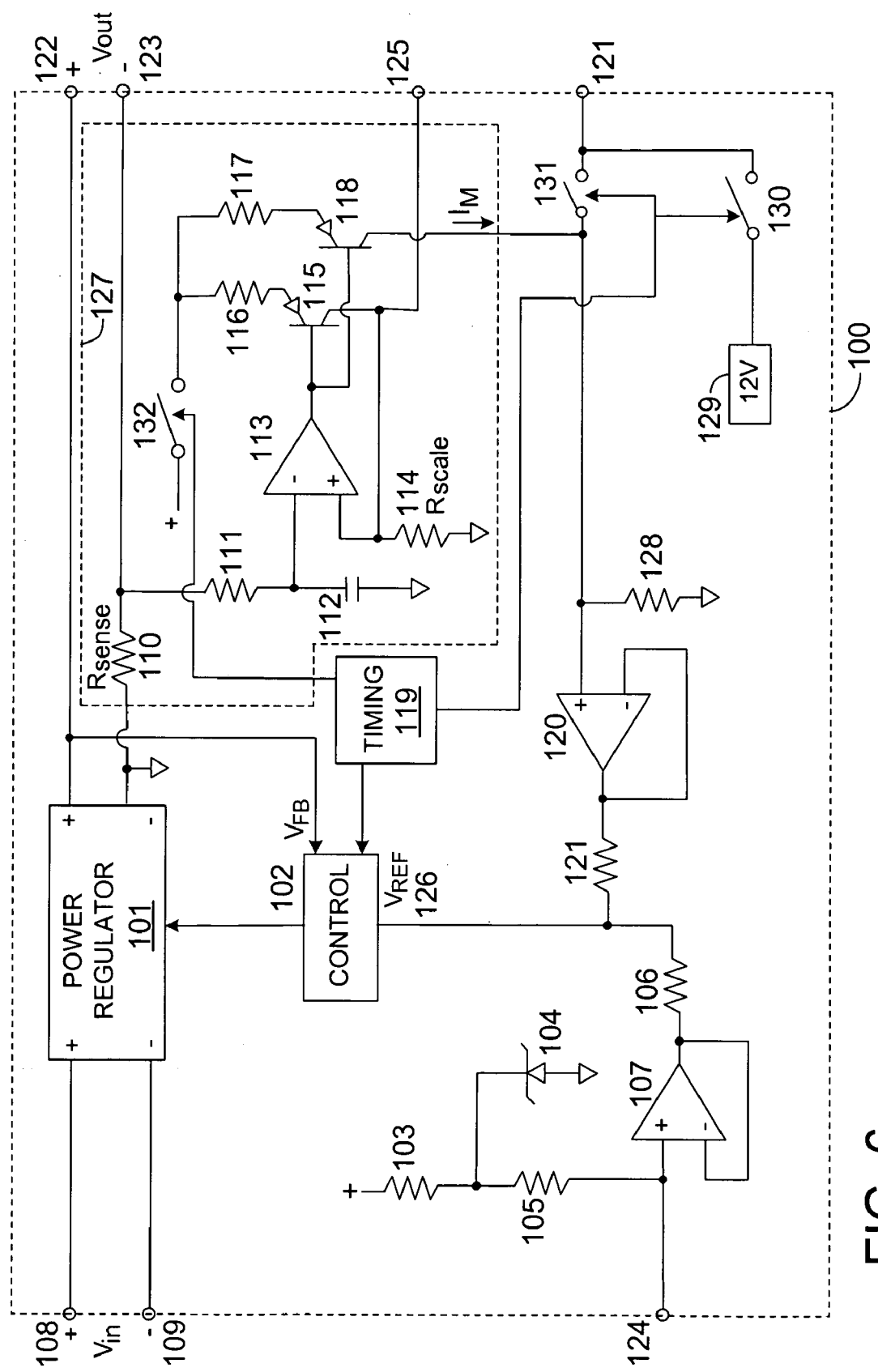
FIG. 6 shows a schematic block diagram of an example of a PRM using a control interface with droop compensation.

Referring to FIG. 6, a schematic block diagram of PRM 100 shows power regulator circuitry 101, which receives power from the input source (22 FIG. 5) via input terminals 108, 109 and supplies power at a controlled voltage to output terminals 122, 123. The power regulator circuitry may be an isolated or non-isolated topology and may be embodied as a buck converter, a boost converter or a buck-boost converter or any other regulation topology suitable for the application. A preferred buck-boost DC-DC conversion topology suitable for use as PRMs is described in Vinciarelli, "Buck-Boost DC-DC Switching Power Conversion," U.S. patent application Ser. No. 10/214,859, filed Aug. 8, 2002, assigned to the same assignee as this application and incorporated by reference.

Control circuitry 102 provides a closed loop feedback mechanism for comparing the PRM output voltage $V_{OUT}$ with a reference voltage $V_{Ref}$ and adjusting the operation of the power regulator circuitry 101 (for example the timing of opening and closing switches in a buck-boost converter) to maintain a constant output voltage as set by the reference voltage $V_{Ref}$. Preferably, the control circuit senses the PRM output voltage at terminals 122, 123 closing the feedback loop around and adjusting for the voltage drop across sense resistor 110. As shown in FIG. 6, zener diode 104 provides a fixed voltage that is buffered by unity gain amplifier 107 and fed via resistor 106 to the reference input 126 of control circuitry 102. The voltage, $V_{Ref}$, at the reference input 126 may be adjusted up or down by sinking or sourcing current from/to terminal 124 creating a voltage drop in resistor 105 which will subtract from or add to the voltage set by zener diode 104.

The scaled current source 127 sources a current, $I_M$, proportional to the output current $I_{PRM}$ of the PRM at terminal 121. Sense resistor 110 connected in series with the PRM output develops a voltage as a function of the PRM output current. The voltage across resistor 110 is input to the inverting input of amplifier 113 through a low pass filter formed by resistor 111 and capacitor 112. The non-inverting input of amplifier 113 is connected to scaling resistor 114, which is driven by transistor 115. In operation, amplifier 113 drives transistor 115 to source a current through scaling resistor 114 that produces a voltage essentially equal to the voltage at the inverting input of amplifier 112 yielding the following scaled relationship.

$$I_M = I_{PRM} * \frac{R_{Sense}}{R_{Scale}} \text{ (where } R_{Scale} = R114\text{)}$$

Transistors 115 and 118 and resistors 116 and 117 are matched so that the current produced by transistor 115 is mirrored by transistor 118 and output via switch 131 at terminal 121.

Figure 7:
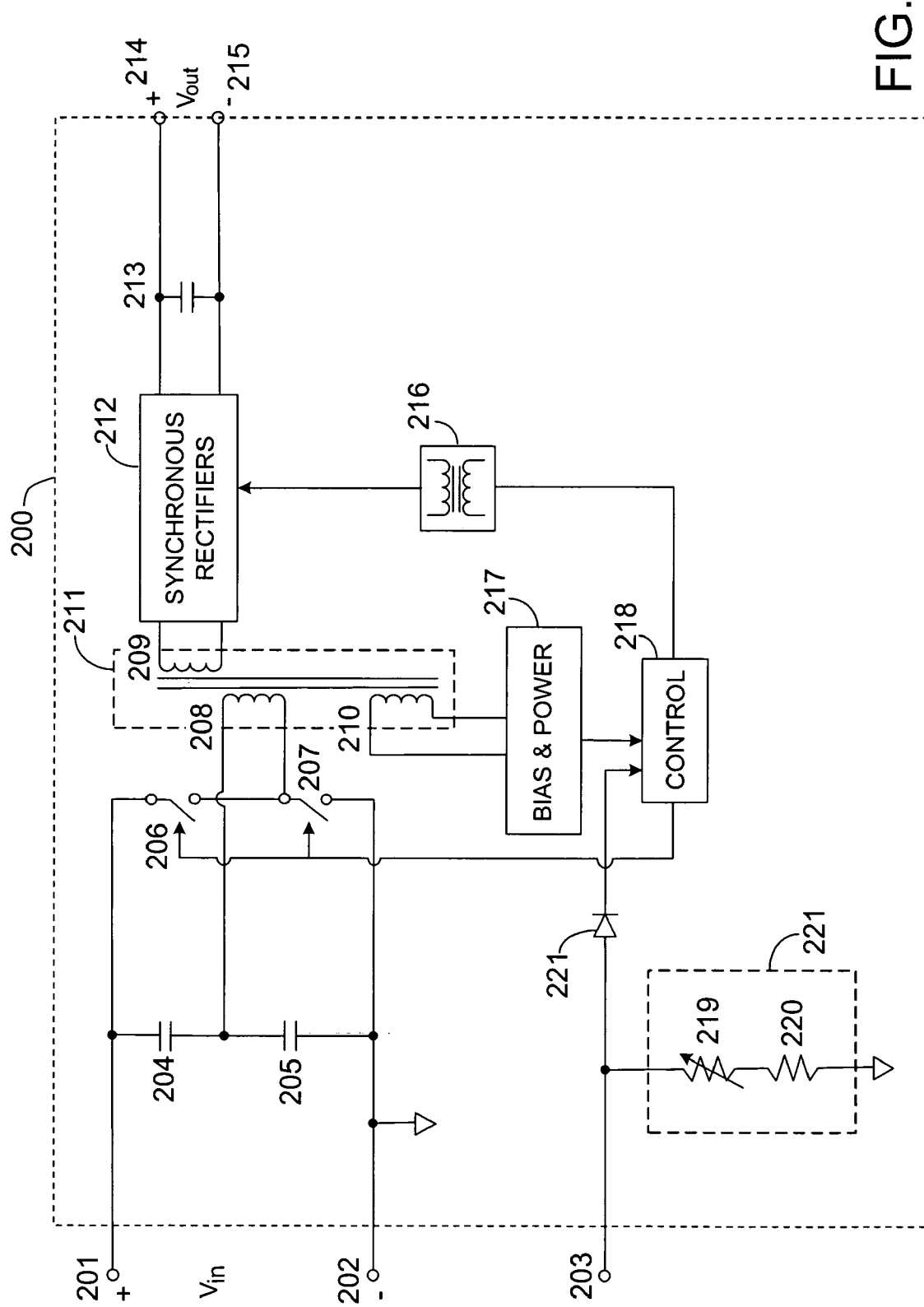
FIG. 7 is a schematic block diagram of an example of a VTM using a control interface with droop compensation.

Referring to FIG. 7, a schematic block diagram of VTM 200 using a half-bridge topology is shown. The primary winding 208 of transformer 211 is driven by the primary circuit that receives power at the input voltage from input terminals 201, 202 and includes resonant capacitors 204, 205 and primary switches 206 and 207. The secondary voltage from secondary winding 209 is rectified by synchronous rectifiers 212, filtered by output capacitance 213, and delivered to output terminals 214, 215. Control circuitry 218 controls the operation of the primary switches 206, 207 and synchronous rectifier 212. The VTM isolation boundary is provided by power transformer 211 and control transformer 216.

A controlled resistance 221 between interface terminal 203 and ground may be provided by fixed resistance 220 and variable resistance 219. The VTM effective series resistance may be determined as discussed in the Factorized Application or by measuring the droop as a function of load current. The VTM effective series resistance varies linearly with temperature. The temperature dependency may be determined by measuring the VTM effective series resistance at two temperatures, e.g. room temperature and a high temperature. Variable resistance 219 may model the change of effective VTM series resistance with VTM operating temperature. The range of variation in the effective VTM series resistance is to some extent dependent upon the VTM configuration. For example, switch conduction resistances may be the dominant factor in a VTM optimized for very low output voltages such as 1 V whereas transformer-winding resistance may be the dominant factor in VTMs optimized for higher voltages. Therefore the effective VTM series resistance may vary by 60% over the operating temperature range for low voltage converters compared with 30% variations for higher voltage models.

The variable resistance 219 may be selected to have a temperature coefficient that approximates or matches the change in effective VTM series input resistance with temperature. The fixed resistance 220 may be a scaled replica of the effective VTM series input resistance at a specific temperature. Together resistances 219 and 220 may closely approximate or exactly match the effective VTM series input resistance. The effective VTM series resistance varies only minimally between VTMs having the same configuration (i.e. the same model, output voltage, current, and transformation ratio, etc.) and therefore need not be characterized individually for each unit. However, fusible resistances may be used to program the controlled resistance during final test of each unit for example on an automated production or test station. Another way to program the controlled resistance, in real time on the manufacturing line, is described in Vinciarelli et al, U.S. Pat. No. 5,443,534, "Providing Electrical Components for Circuit Assembly," assigned to the same assignee as this application and incorporated herein by reference. As described above, the controlled current flows through the controlled resistance producing a voltage that approximates the voltage drop across the effective VTM series resistance as a function of load, i.e., the droop voltage.

Referring back to FIG. 6, the voltage at interface terminal 121 is buffered by unity gain amplifier 120 and presented to the reference input 126 of the PRM control circuitry 102. The reference voltage and the droop voltage are mixed by resistors 106 and 121 to adjust the reference voltage $V_{Ref}$. Resistors 106 and 121 may also provide scaling to translate the droop voltage to the appropriate change in reference voltage. For example, resistor 121 may have a higher value than resistor 106 for a system in which the reference voltages is a fraction of the output voltage. As is shown in FIG. 6, the reference voltage is increased by the amount of the droop voltage to provide a reference voltage appropriate to increase the PRM output voltage by the amount of the droop enabling the FPA system (shown in FIGS. 5–7) to provide excellent load regulation without the need for a feedback controller at the point of load.

Consider for example, a low voltage VTM (having voltage transformation ratio of $K=V_{OUT}/V_{IN}=1/32$, a nominal output voltage $V_{OUT}=1.0$ V, a maximum output current $I_{OUT}=100$ A, and an effective series output resistance $R_{OUT}=0.9$ mΩ) is coupled with a 32V output PRM. Assume that the current mirror sources a current $I_M=I_{PRM}*10^{-3}$ and that the controlled resistance $R_{Ctrl}=R_{IN}\times 10^3$ to produce an interface voltage that is scaled 1:1 relative to the input droop voltage. The VTM output droop will range from 0 Volts at no load to 0.09 Volts at full load which represents a 9% drop in output voltage at full load. The effective input resistance is $$R_{IN}=R_{OUT}/K^2=0.0009/(1/32)^2=0.92 \text{ Ω};$$

the controlled resistance should be $$R_{Ctrl}=R_{IN}*10^3=920 \text{ Ω};$$

the maximum input current is $$I_{IN}=I_{OUT}*K=100(1/32)=3.13 \text{ A};$$

and, at full load, the current mirror should source $$I_M=I_{PRM}*10^{-3}=3.13 \text{ mA}.$$

At full load, the droop reflected to the input, $V_{in\text{-}droop}$, is $$V_{IN\text{-}droop}=I_{IN}*R_{IN}=3.13*0.92=2.88 \text{ V};$$

and, the interface voltage is $$I_{I/F}=I_M*R_{Ctrl}=3.13 \text{ }(10^{-3})*920=2.88 \text{ V}.$$

The compensation system boosts the PRM output voltage by 2.88 Volts to compensate for the droop at the VTM. The controlled resistance and the current mirror do not need to provide perfect models of the VTM series input resistance and the PRM output current. Similarly, the droop compensation system does not need to provide perfect compensation for the droop. Excellent regulation may be achieved even if the system corrects for only 90% of the droop. For example, a 90% correction of a 9% droop results in a variation of only 0.9% in output voltage over the full output current range.

As described above, the compensation system uses a model of the effective series resistance of the VTM reflected to the input. References and feedback controllers at the point of load and connections crossing the VTM isolation barrier are unnecessary. The compensation system uses a feed forward system supporting very high bandwidth operation by eliminating remote loop delays introduced for example by remote feedback controllers. Furthermore, no adjustments are needed to account for the transformation ratio of the VTM, allowing any VTM (regardless of transformation ratio, output voltage, power rating, or output resistance) to be combined with any PRM. This feature provides plug-and-play interoperability between families of PRMs and VTMs allowing customers to mix and match PRMs with different VTMs while still benefiting from the droop compensation system.

The compensation system is also scalable providing plug-and-play operability in power sharing arrays. Referring to FIG. 5B, a power sharing array comprising two VTMs 200A, 200B connected in parallel supplies power to load 25. Each terminal of the VTMs is connected to the respective terminal of the other VTM in the array and the array is connected into the FPA system as if it were a single VTM. Consider that parallel connected VTMs 200A, 200B differ from the single VTM 200 in FIG. 5A only in the value of the total effective series resistance because the effective series resistance of the array $R_{IN-Array}$ is reduced to a value equal to the parallel combination of the individual effective VTM series resistances $R_{IN-VTM}$. Since $R_{IN-VTM}$ should be the same for a number, N, of VTMs connected in an array, the effective array series input resistance may be expressed as follows.

$$R_{IN-Array} = 1/N * R_{IN-VTM}$$

Using the VTM parameters discussed above as an example, the array output will be 1V, K=1/32, and the effective series input resistance for the array $R_{IN-Array}$ will be:

$$R_{IN-Array} = \frac{1}{2} * R_{IN-VTM} = \frac{1}{2} * 0.92 = 0.46 \, \Omega$$

Similarly, the interface pins 203A, 203B are connected together, resulting in a parallel connection of the individual VTM controlled resistances $R_{Ctrl-VTM}$ and a concomitant reduction in the total array controlled resistance.

$$R_{Ctrl-Array} = 1/N * R_{Ctrl-VTM} = \frac{1}{2} * 920 = 460 \, \Omega$$

The interface voltage presented to the interface connection 12 as a result of the mirror current flowing will accordingly reflect the droop resulting from the effective series resistance of the converter at the load whether it is a single VTM or a power sharing array of VTMs. The present compensation system therefore allows customers to connect VTMs in parallel without making any circuit adjustments.

Referring to FIG. 6, the compensation system may be further expanded to compensate for resistances (not shown) between the VTM output terminals, 214, 215 and the load 25 (FIG. 5). Terminal 125, provides a connection to the non-inverting input of amplifier 113 allowing a customer to add a resistance in parallel with scaling resistor 114 to change the effective scaling resistance, $R_{Scale}$, of the current mirror, thereby increasing the current, $I_M$, output by the controlled current source. The increase in source current $I_M$ produces an increase in the voltage across the controlled resistance and at the interface terminal 121, which in turn produces a greater droop correction at the output of the PRM. The additional resistance connected in parallel with resistor 114 may thus be used to compensate for the resistance of wiring between the VTM output and the load.

On/Off and Start-Up Control

The interface connection 12 may also provide ON-OFF control of the VTM. Referring to FIG. 7, an auxiliary winding 210 coupled to power transformer 211 may be used to provide power to the VTM bias and power circuitry 217 while the VTM is operating and a predetermined minimum input voltage is available at the VTM input terminals 201, 202 (or output terminals 214, 215 for a bi-directional VTM). No power is available from the auxiliary winding 210 until after the VTM is already processing power, therefore, a connection (not shown) from the input terminals 201, 202 to the control circuitry 218 may be used to provide the VTM with starting capability. It may be desirable to make the connection from the VTM inputs switchable to reduce power dissipation. In some applications, it may be desirable for the VTM control circuitry to compare the VTM input voltage to an internal reference providing an under-voltage lockout function which prevents self-activation of the VTM while the input voltage is below a minimum set by the reference.

A connection from the interface terminal 203 to the VTM control circuitry 218 may be provided by diode 221. By applying a voltage, e.g. 12 Volts, above a first predetermined threshold at the interface terminal 203, the control circuitry 218 may be activated commencing operation of the VTM 200. Once started, the VTM will continue to operate as long as sufficient voltage is present at the VTM input terminals 201, 202 (or output terminals 214, 215 for a bidirectional VTM) to power the control circuitry through the auxiliary winding 210 and bias and power circuitry 217.

For greater flexibility, the VTM control circuitry 218 may be adapted to operate from power received from the interface terminal 203 in addition to the sources discussed above (auxiliary winding 217 and directly from VTM input terminals 201, 202). For applications in which the control circuitry requires a voltage higher than used by the On-Off interface, a boost circuit (not shown) may be used to boost the interface voltage to a level sufficient to operate the VTM. Powering the VTM from the control interface expands the dynamic range of the VTM.

Appropriate scaling of the first predetermined threshold (i.e., to a voltage greater than the maximum voltage developed by the droop compensation system under full load) may be used to allow the control interface and droop compensation interface to share the same terminal. While the VTM is operating (and the droop compensation system is operational), the cathode of diode 221 may be held at a voltage (greater than the highest used by the droop compensation system) to keep diode 221 reverse biased, and ensure that the droop compensation system senses only the controlled resistance 221.

For applications in which the VTM is connected to a dedicated PRM, the VTM may be allowed to continue to run after the PRM is disabled to draw down the Factorized bus voltage. In more complex systems, the control circuitry may include deactivation circuitry triggered by pulling the interface terminal 203 below a second predetermined threshold. Alternatively, a specific pulse train sent via the interface may be used or a second control terminal may be provided to shut down the VTM.

Referring to FIG. 6, the PRM 100 may include a voltage source 129 connected to the interface terminal 121 via switch 130. Timing circuitry 119 may be used to enable or disable the droop compensation circuitry using switches 131 and 132, enable the PRM control circuitry, and enable the VTM via the interface connection 12 (shown in FIG. 5A). Referring to FIGS. 9A–9E, the PRM and VTM are off (and switches 130–132 are open) at time $t_0$ when a system enable signal is produced or received by the PRM. The timing circuit closes switch 130 at time $t_1$ as shown in FIG. 9B sending a 12 Volt VTM enable signal via interface connection 12 to the VTM activating the VTM as described above.

A short time later, e.g. 100 μS, at time $t_2$, the timing circuitry 119 enables the PRM control circuitry 102 (as shown in FIG. 9C) allowing the PRM output voltage to ramp up as shown in FIG. 9E. The delay between the VTM enable $t_1$ and the PRM enable $t_2$ ensures that the PRM will not start before the VTM. This allows the VTM output to ramp up with the PRM output thereby limiting the VTM in-rush current and maintaining compatibility with point of load feedback controllers, e.g. controllers 26 in FIGS. 3 and 4. The PRM may open switch 130 (removing the VTM enable signal) a short period of time later, at time $t_3$, as shown in FIG. 9B to ensure that the VTM is operating under its own power. The period should be long enough, e.g. 10 mS, to accommodate any start-up delays in the VTM. The VTM enable signaling is complete at time $t_3$ allowing the interface to be used for the droop compensation signaling.

Timing circuitry 119 provides a small delay between opening switch 130 at time $t_3$ and closing switches 131 and 132 at time $t_4$ allowing parasitic capacitances on the interface connection 12 to discharge. Referring to FIG. 6, switch 131 connects the current mirror and interface voltage sense circuit to the interface terminal 121 and switch 132 provides power to the transistor current sources 115 and 118. A resistor 128 pulls the buffer amplifier input low while the compensation circuit is inactive to prevent perturbances at the reference input 126. As shown in FIG. 9E, at time $t_4$ when the droop compensation circuit is activated, the PRM output voltage climbs from voltage V2 representing the output without droop compensation to voltage V1 representing the droop corrected output voltage.

The PRM may also use the interface connection 12 to keep the VTM operational when the VTM input voltage drops below its minimum input, or lockout, voltage, by providing a constant voltage on the interface connection thus powering the VTM control circuitry. Operating on power from the interface connection, the VTM will transfer power from input to output for gradual charging of output capacitances during start-up or from output to input for discharging the load capacitors. This mode of operation may be beneficial in systems having large energy storage capacitances.

The PRM may disable the VTM (using one of the disable interfaces discussed above) whenever the PRM is disabled, ensuring that the VTM goes off whenever the upstream PRM goes off irrespective of the presence of a voltage source at the output of the VTM (or else the bi-directionality of the VTM would keep the VTM on). This may be particularly important in load sharing applications where a load is powered by a multiplicity of VTMs powered by respective PRMs and the PRMs are turned ON and OFF independently of one another.

The On/Off/Start-Up control system may provide any of a number of potential benefits. VTM in-rush current may be controlled or eliminated at startup. The maximum allowable load capacitance may be extended to any practical limit. Start up with capacitive loads having even more than 1 Joule of energy storage may be realized non-dissipatively. The operating output voltage range of VTMs may be extended down to zero using an external bias supply (e.g. from a 12V bus or from the PRM) providing "infinite" dynamic range. Further reductions in VTM size and cost, particularly at lower power levels, may be realized by eliminating start-up capacitor requirements.

A number of embodiments of the invention have been described. Nevertheless, it will be understood that various modifications may be made without departing from the spirit and scope of the invention. For example, the current mirror may be contained in the VTM, which would send a correction signal to the PRM. The compensation system may include a direct measure of the voltage droop or of an error voltage. The VTM may send a digital representation of the effective series resistance, the required voltage correction, or status or other operational parameters to the PRM, for example using a serial bit stream. Although, the preferred embodiment uses a single pin implementation of the interface with the droop compensation and on-off systems multiplexed onto a single connection, the interface may be spread across two or more pins or connections. The droop compensation system and the On-Off control system may be advantageously used alone or in combination. Accordingly, other embodiments are within the scope of the following claims.

What is claimed is:

1. An apparatus comprising:
   an upstream regulator having a regulator input for receiving power from a source, a regulator output for delivering power at an output current and a controlled voltage, and an upstream signal interface ("USI");
   a downstream voltage transformation module ("VTM") having a VTM input for receiving power from the regulator output, a VTM output for supplying power to a load, and a downstream signal interface ("DSI") for connection to the USI, the VTM having an essentially fixed voltage transformation ratio $K=V_{OUT}/V_{IN}$ and providing isolation between the VTM input and VTM output;
   the upstream regulator being adapted to provide a first control signal to activate the VTM via the USI-DSI connection; and
   the VTM being adapted to provide feedback to the upstream regulator via the USI-DSI connection.

2. The apparatus of claim 1 wherein the VTM further comprises circuitry connected to receive power from the upstream regulator via the USI-DSI connection when a voltage of the regulator output is below a predefined level.

3. The apparatus of claim 1 wherein the upstream regulator further comprises a current source connected to the USI to provide a current proportional to an output current provided by the regulator output.

4. The apparatus of claim 3 wherein the VTM is characterized by an effective series resistance, the VTM further comprises a controlled resistance having a resistance value connected to the DSI, and the resistance value is an approximation of the effective series resistance.

5. The apparatus of claim 4 wherein the upstream regulator further comprises circuitry to sense a USI voltage at the USI and adjust the regulator output in response to changes in the USI voltage.

6. The apparatus of claim 4 wherein the effective series resistance is an input resistance.

7. The apparatus of claim 4 wherein the series resistance of the VTM is temperature dependent and the resistance value is a function of a temperature of the VTM.

8. The apparatus of claim 1 wherein the upstream regulator regulates a voltage of the regulator output.

9. The apparatus of claim 1 wherein the upstream regulator regulates a voltage at the output of the VTM using the USI-DSI connection.

10. An apparatus comprising:
    an upstream regulator at a first location having a regulator input for receiving power from a source, a regulator output for delivering power at an output current and a controlled voltage, and an upstream signal interface ("USI");

a downstream voltage transformation module ("VTM") at a remote location separated by a distance from the first location having a VTM input for receiving power from the regulator output, a VTM output for supplying power to a load, and a downstream signal interface ("DSI") for connection to the USI, the VTM having an essentially fixed voltage transformation ratio $K=V_{OUT}/V_{IN}$ and providing isolation between the VTM input and VTM output; and the VTM being adapted to provide a compensation signal representative of imperfections in the VTM to the upstream regulator via the USI-DSI connection, and the upstream regulator being adapted to adjust the controlled voltage in response to the compensation signal.

11. An apparatus comprising:

an upstream regulator having a regulator input for receiving power from a source, a regulator output for delivering power at an output current and a controlled voltage, and an upstream signal interface ("USI");

a downstream voltage transformation module ("VTM") having a VTM input for receiving power from the regulator output, a VTM output for supplying power to a load, and a downstream signal interface ("DSI") for connection to the USI, the VTM having an essentially fixed voltage transformation ratio $K=V_{OUT}/V_{IN}$ and providing isolation between the VTM input and VTM output;

the VTM including control circuitry adapted to receive a first control signal via the DSI and to activate the VTM in response to the first control signal and adapted to run off of power derived from the first control signal;

the regulator being adapted to send the first control signal via the USI terminal to activate the VTM.

12. A method comprising:

using an upstream regulator having an upstream signal interface ("USI") to receive power from a source and deliver power at an output current and a controlled voltage to a regulator output;

using a downstream voltage transformation module ("VTM") having a downstream signal interface ("DSI") for connection to the USI, an essentially fixed voltage transformation ratio $K=V_{OUT}/V_{IN}$ and isolation between a VTM input and a VTM output to receive power from the regulator output via the VTM input and to supply power to a load via the VTM output;

providing a connection between the USI and the DSI;

sending a first control signal via the USI-DSI connection to activate the VTM; and using the VTM to provide feedback to the upstream regulator via the USI-DSI connection.

13. The method of claim 12 further comprising using the upstream regulator to provide power to the VTM via the USI-DSI connection.

14. The method of claim 12 further comprising using the upstream regulator to source a current to the USI that is proportional to an output current provided by the regulator output.

15. The method of claim 14 further comprises providing a controlled resistance connected to the DSI, wherein the controlled resistance has a resistance value that is an approximation of an effective series resistance of the VTM.

16. The method of claim 15 further comprising sensing a USI voltage at the USI and adjusting the regulator output in response to changes in the USI voltage.

17. The method of claim 15 wherein the effective series resistance is an input resistance.

18. The method of claim 15 wherein the effective series resistance of the VTM is temperature dependent and the resistance value is a function of a temperature of the VTM.

19. The method of claim 12 further comprising using the upstream regulator to regulate a voltage of the regulator output.

20. The method of claim 12 further comprising using the upstream regulator to regulate a voltage at the output of the VTM using the USI-DSI connection.

21. A method comprising:

using an upstream regulator at a first location, the regulator having an upstream signal interface ("USI") to receive power from a source and deliver power at an output current and a controlled voltage to a regulator output;

using a downstream voltage transformation module ("VTM") at a remote location separated by a distance from the first location, the VTM having a downstream signal interface ("DSI") for connection to the USI, an essentially fixed voltage transformation ratio $K=V_{OUT}/V_{IN}$ and isolation between a VTM input and a VTM output to receive power from the regulator output via the VTM input and to supply power to a load via the VTM output;

providing a connection between the USI and the DSI;

using the VTM to provide a compensation signal representative of imperfections in the VTM to the upstream regulator via the USI-DSI connection, and using the upstream regulator to adjust the controlled voltage in response to the compensation signal.

22. A method comprising:

using an upstream regulator having an upstream signal interface ("USI") to receive power from a source and deliver power at an output current and a controlled voltage to a regulator output;

using a downstream voltage transformation module ("VTM") having a downstream signal interface ("DSI") for connection to the USI, an essentially fixed voltage transformation ratio $K=V_{OUT}/V_{IN}$ and isolation between a VTM input and a VTM output to receive power from the regulator output via the VTM input and to supply power to a load via the VTM output;

providing a connection between the USI and the DSI;

sending a first control signal via the USI-DSI connection to activate the VTM and to power the VTM.

23. An apparatus comprising:

a voltage transformation module ("VTM") having a VTM input for receiving power at a controlled voltage from a power regulator, a VTM output, and circuitry for converting power received from the VTM input via a transformer, delivering power to a load at the VTM output, and providing isolation between the VTM input and VTM output;

the VTM being characterized by an essentially fixed voltage transformation ratio $K=V_{OUT}/V_{IN}$, where $V_{OUT}$ is the voltage at the VTM output and $V_{IN}$ is the voltage at the VTM input, and an effective VTM series resistance;

control circuitry for operating the VTM; and an interface circuit adapted to interface to the power regulator and adapted to generate a signal representative of imperfections in the VTM;

wherein the VTM is packaged separately from the power regulator.

24. The apparatus of claim 23 wherein the signal is representative of the effective VTM series resistance.

25. The apparatus of claim 23 wherein the signal is representative of the VTM droop.

26. The apparatus of claim 24 wherein the interface circuit comprises a controlled resistance.

27. The apparatus of claim 26 wherein the controlled resistance is a temperature compensated model of the effective VTM series resistance.

28. The apparatus of claim 26 wherein the controlled resistance is a temperature compensated model of the effective VTM series input resistance.

29. The apparatus of claim 23 wherein the interface circuit further comprises circuitry adapted to receive a first control signal and activate the VTM in response to receipt of the first control signal.

30. The apparatus of claim 29 wherein the control circuit is adapted to run off of power derived from the first control signal.

31. The apparatus of claim 30 wherein the interface circuit is further adapted to receive a second control signal and deactivate the VTM in response to receipt of the second control signal.

32. An apparatus comprising:
a voltage transformation module ("VTM") having a VTM input, a VTM output, and circuitry for converting power received from the VTM input via a transformer, delivering power to a load at the VTM output, and providing isolation between the VTM input and VTM output;
the VTM being characterized by an essentially fixed voltage transformation ratio $K=V_{OUT}/V_{IN}$, where $V_{OUT}$ is the voltage at the VTM output and $V_{IN}$ is the voltage at the VTM input, and an effective VTM series resistance;
an interface circuit adapted to receive a first control signal and activate the VTM in response to receipt of the first control signal;
control circuitry adapted to operate the VTM and to run off of power derived from the first control signal.

33. The apparatus of claim 32 wherein the interface circuit is further adapted to deactivate the VTM in response to receipt of a second control signal.

34. A method comprising:
providing a voltage transformation circuit having an input, an output, and a signal interface, to convert power received at a controlled voltage from an external power regulator via the input and to supply power to an external load via the output using an essentially fixed voltage transformation ratio $K=V_{OUT}/V_{IN}$ and providing isolation between the input and the output, the circuit having an effective series resistance;
providing an interface circuit adapted to interface to the power regulator and adapted to generate a signal representative of imperfections in the voltage transformation circuit; and
enclosing the voltage transformation circuit and interface circuit in a first package separately from the power regulator.

35. The method of claim 34 wherein the signal is representative of the effective series resistance.

36. The method of claim 34 wherein the signal is representative of droop in an output voltage of the voltage transformation circuit.

37. The method of claim 35 wherein the interface circuit comprises a controlled resistance.

38. The method of claim 37 wherein the controlled resistance is a temperature compensated model of the effective series resistance.

39. The method of claim 37 wherein the controlled resistance is a temperature compensated model of the effective series input resistance.

40. The method of claim 34 wherein the interface circuit further comprises circuitry adapted to activate the voltage transformation circuit in response to receipt of a first control signal from the signal interface.

41. The method of claim 40 wherein the voltage transformation circuit is adapted to be powered by the first control signal.

42. A method comprising:
providing a voltage transformation circuit having an input, an output, and a signal interface, to convert power received at a controlled voltage from an external power regulator via the input and to supply power to an external load via the output using an essentially fixed voltage transformation ratio $K=V_{OUT}/V_{IN}$ and providing isolation between the input and the output, the circuit having an effective series resistance;
providing an interface circuit adapted to activate the voltage transformation circuit in response to receipt of a first control signal from the signal interface, wherein the voltage transformation circuit is adapted to be powered by the first control signal; and
enclosing the voltage transformation circuit and interface circuit in a first package separately from the power regulator.

43. An apparatus comprising:
a power regulator module ("PRM") having an input for receiving power from a source,
an output for delivering power to a voltage transformation module ("VTM") at an output current and a controlled voltage,
an interface circuit having an upstream interface ("USI") terminal for connection to a downstream interface ("DSI") terminal at the VTM,
the interface circuit being adapted to receive a compensation signal via the USI terminal representative of imperfections in the VTM and adjust the controlled voltage in response to the compensation signal,
the interface circuit being adapted to send a first control signal via the USI terminal to activate the VTM.

44. The apparatus of claim 43 wherein the interface circuit is further adapted to request a compensation signal from the VTM using a polling signal sent from the interface circuit via the USI terminal to the DSI terminal.

45. The apparatus of claim 44 wherein
the polling signal is a controlled current,
the compensation signal is a voltage representative of VTM droop, and
the interface circuit further comprises a controlled current source having an output connected to the USI terminal for supplying the controlled current and a sense circuit for sensing the voltage at the USI terminal.

46. The apparatus of claim 45 wherein the controlled current is proportional to the output current.

47. The apparatus of claim 46 wherein the PRM further comprises a reference circuit and the sense circuit comprises an output coupled to the reference circuit to adjust the controlled voltage.

48. The apparatus of claim 43 wherein the PRM comprises a source for powering the VTM via the USI.

49. The apparatus of claim 43 wherein the interface circuit sends and receives digital signals via the USI terminal.

50. An apparatus comprising:
a power regulator module ("PRM") having an input for receiving power from a source, an output for delivering power to a voltage transformation module ("VTM") at an output current and a controlled voltage, regulation circuitry for maintaining the controlled voltage, an interface circuit having an upstream interface ("USI") terminal for connection to a downstream interface ("DSI") terminal at the VTM, a source circuit having an output adapted to send a first signal to the VTM via the USI terminal, and a sense circuit having an input adapted to receive a compensation signal via the USI terminal representative of imperfections in the VTM and an output connected to the regulation circuitry to adjust the controlled voltage in response to the compensation signal.

51. The apparatus of claim 50 wherein the first signal is representative of the output current.

52. The apparatus of claim 50 wherein the interface circuit sends and receives digital signals via the USI terminal.

53. An apparatus comprising:
a power regulator module ("PRM") having an input for receiving power from a source,
an output for delivering power from the PRM to a voltage transformation module ("VTM") at an output current and a controlled voltage, and
interface circuitry having an upstream signal interface ("USI") terminal for connection to a downstream signal interface ("DSI") terminal at the VTM,
the interface circuitry being adapted to communicate with the VTM via the USI,
the interface circuitry being adapted to provide power to the VTM via the USI independently of the power delivered from the output.

54. A method comprising:
using a power regulator circuit having an input for receiving power from a source, to deliver power at a controlled voltage and at an output current to an output for a downstream VTM,
the power regulator circuit having an interface terminal,
using the interface terminal to receive a compensation signal and adjust the controlled voltage in response to the compensation signal, and
using the interface terminal to send a first control signal to activate the VTM.

55. The method of claim 54 further comprising using the interface terminal to send a polling signal to request a compensation signal from the VTM.

56. The method of claim 55 wherein the polling signal is a controlled current, and the compensation signal is a voltage representative of VTM droop.

57. The method of claim 56 wherein the controlled current is proportional to the output current.

58. The method of claim 54 further comprising connecting a source for powering the VTM to the interface terminal.

59. The method of claim 54 further comprising using digital signals to communicate via the interface terminal.

60. A method comprising:
using a power regulator circuit having an input for receiving power from a source, to deliver power at a controlled voltage and at an output current to an output for a downstream voltage transformation module ("VTM"),
the power regulator circuit having an interface terminal,
using the interface terminal to send a first signal to the VTM and to receive a compensation signal representative of imperfections in the VTM and adjust the controlled voltage in response to the compensation signal.

61. The method of claim 60 wherein the first signal is representative of the output current.

62. A method comprising:
using a power regulator circuit having an input for receiving power from a source, to deliver power at a controlled voltage and at an output current to an output for a downstream voltage transformation module ("VTM"),
the power regulator circuit having an interface terminal,
using the interface terminal to receive a compensation signal and adjust the controlled voltage in response to the compensation signal, and
connecting a source for powering the VTM to the interface terminal.

* * * * *